Oct. 22, 1935.  C. R. PATON  2,018,502
MOTOR VEHICLE
Filed Nov. 6, 1931
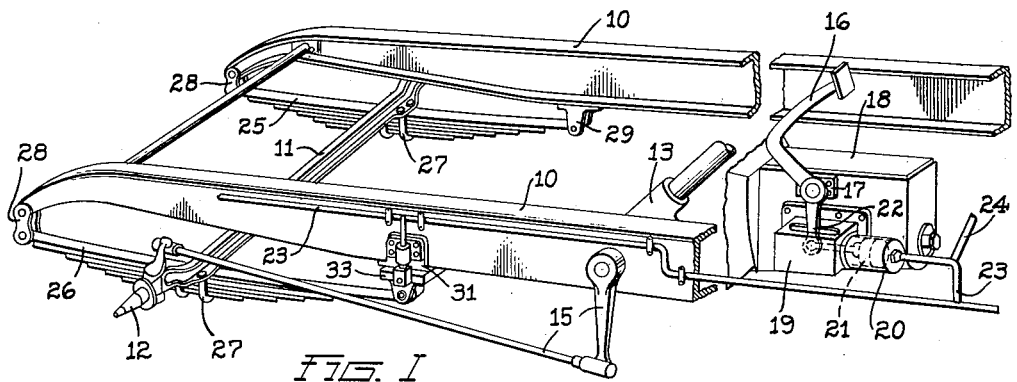
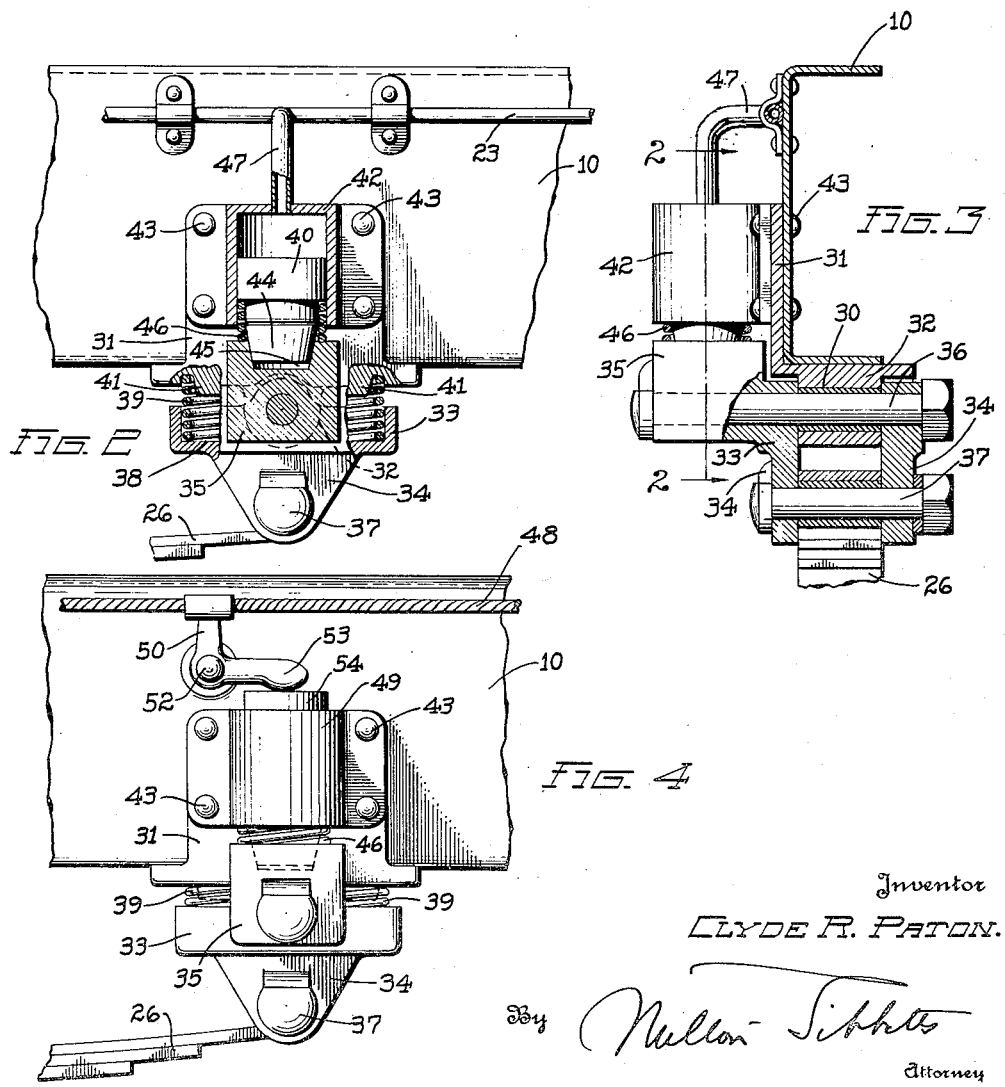
Inventor
CLYDE R. PATON.
By Milton Tibbetts
Attorney Patented Oct. 22, 1935

2,018,502

UNITED STATES PATENT OFFICE 2,018,502

MOTOR VEHICLE

Clyde R. Paton, Birmingham, Mich., assignor to Packard Motor Car Company, Detroit, Mich., a corporation of Michigan Application November 6, 1931, Serial No. 573,435

13 Claims. (Cl. 280—124)

This invention relates to motor vehicles and more particularly to vehicle suspension mechanism.

Unsteadiness of various parts of the running and steering gear of motor vehicles manifests itself in various forms known as "shimmy", "wheel wobble", "tramping" and the like. This undesirable condition has been generally overcome by devices such as are shown and described in the patents to Pierre Lemaigre Nos. 1,747,780 and 1,747,781 in which a spring mounted shackle is pivoted on the main frame and is arranged to pivotally support one end of a front suspension spring, preferably on the steering gear side.

While these devices overcome the unsteadiness encountered under the general running conditions of a motor vehicle, under conditions of unusually rapid deceleration, for example, during violent application of the brakes, the forces are such that the resilient members tend to collapse and allow the shackle to tilt or "bottom" due to its pivotal mounting.

When the shackle thus tilts, the front spring to which it is attached will be permitted to move longitudinally relative to the frame. The front axle being secured to the spring, such movement causes one end thereof to move in a horizontal plane relative to the opposite end and relative to the frame. This movement causes the front wheels to turn to the side on which the shackle is attached, with the result that the vehicle tends to veer to one side rather than proceed in the intended course.

It might be possible to overcome this effect by providing stronger springs in certain parts of the suspension or in the strengthening of all springs alike, but if this were done, a greater part of the action of the shock absorber in eliminating undesirable unsteadiness would be lost.

The present invention contemplates the provision of a spring suspension system for a motor vehicle body including a resiliently mounted tiltable spring shackle pivotally supporting one end of a front suspension spring and pivoted also to the chassis frame. A movable, releasable stop member operable by the brake actuating mechanism is also provided which is adapted to coact with the shackle member to limit or prevent movement thereof when the brakes are applied. By such construction unsteadiness of the running and steering gear is absorbed and at the same time the front wheels of the vehicle are prevented from veering to one side due to the causes above pointed out.

An object of this invention is to provide a suspension system for a motor vehicle in which the running and steering gear are steady under all operating conditions without affecting the direction of travel of the vehicle.

Another object of this invention is to provide a vehicle suspension system having a movable shimmy absorbing shackle with means for limiting or preventing movement of the shackle under certain operating conditions of the vehicle.

Another object of the invention is to provide means on a motor vehicle having a tiltable shimmy absorbing shackle for preventing the turning of the front wheels from their intended course upon severe application of the brakes.

A further object of the invention is to provide a tiltable shimmy absorbing shackle mounted between one end of a spring and a frame, with means for limiting or preventing the tilting movement of the shackle upon application of the vehicle brakes.

Still another object of this invention is to provide a motor vehicle suspension system having a movable shimmy absorbing shackle with means operable by and in conjunction with the brake operating means adapted to limit or prevent movement of the shackle under certain operating conditions of the vehicle.

Other objects and advantages will become apparent to those skilled in the art from a reading of the following description taken in connection with the accompanying single sheet of drawing which forms a part of the specification, and in which:

Fig. 1 is a view in perspective of a portion of a chassis and running gear of a motor vehicle with which this invention is applied;

Fig. 2 is an enlarged view shown partly in section and partly in elevation of the movable shimmy absorbing shackle and the stop or locking member illustrated generally in Fig. 1, the view being taken on the line 2—2 of Fig. 3;

Fig. 3 is a side view of the device illustrated in Fig. 2 shown partly in elevation;

Fig. 4 is a front elevational view of a modification of this invention.

Referring to the drawing, 10 indicates the side members of a conventional motor vehicle chassis frame. A front axle 11 extends transversely beneath the forward end of the frame and carries spindles, as indicated at 12, at its ends for mounting the front wheels. The spindles are connected in the usual manner by a tie rod (not shown) and are controlled by a steering gear indicated generally at 13 which is connected through means of the usual linkage indicated at 15. A brake pedal 16 is pivotally secured by means of a bracket 17 to a transmission housing indicated generally at 18, and a supporting housing 19 for a master hydraulic brake operating cylinder 20 is also secured by any suitable means to the transmission housing. A piston 21 adapted to reciprocate within the master cylinder is connected by means of suitable linkage to the lower arm 22 of the brake pedal so that when the brake pedal is depressed the piston will be moved in the cylinder, thus compressing the fluid therein. Suitable fluid conduits 23 and 24 connect the cylinder 20 with conventional hydraulic brake mechanism (not shown).

A pair of leaf springs 25 and 26 extend longitudinally beneath the forward end of the frame and are secured substantially centrally to the front axle by U-bolts 27. As shown in Fig. 1, the forward ends of the springs are pivotally connected with the forward ends of the frame by pivoted shackles 28 of conventional design. The rear end of the leaf spring assembly 25 is pivotally mounted on a fixed bracket 29 secured to the under side of the frame member 10. This construction provides a fixed and immovable pivot for one end of this spring whereby any longitudinal movement thereof relative to the frame member is prevented.

The rear end of the spring assembly 26 is secured to the corresponding frame member by a bracket 31, such bracket being so constructed that it provides a pivotal mounting for a shimmy absorbing shackle member to which the end of this spring is pivoted, which construction permits a shifting in the location of the axis of the spring pivot relative to the frame member. The bracket 31 is formed with a lug 32 adapted to rest against the under side of the frame member 10 and which has a bore 30 therethrough. A movable shimmy absorbing shackle member 33 is associated with the rear end of the spring 26 and the lug 32 of the bracket 31, and is in the form of a slotted plate having a pair of integral downwardly extending ears 34 between which the rear eye of the spring 26 extends. The outer face of the plate 33 is formed with an extended portion 35 to provide a socket at the outer side of the frame member 10. A pin 36 extends through the shackle member and through the bore 30 in the lug 32 to pivot the shackle member with the lug portion of the bracket, while a pin 37 extends through the ears 34 and the rear eye of the spring 26 to pivotally connect the shackle and the spring. The shackle member is formed with one or more recesses 38 on opposite sides of the pin 36 and coil springs 39 are seated in such recesses. The springs extend perpendicularly and bear against the lug portion of the bracket and are located with respect thereto by means of bosses as indicated at 41.

By the construction above described, it will be apparent that the spring suspension of the vehicle frame relative to the axle is accomplished on one side of the vehicle by means of a spring assembly secured to the frame member at one end by a shackle and at the other end by a fixed pivot, and on the other side of the vehicle by a spring mounted in a similar manner except that in place of a fixed pivot there is provided a pivotal mounting for the spring, the pivotal axis of which is capable of being displaced under varying conditions of travel of the vehicle.

It has been found that such structure, under most operating conditions, eliminates so-called "shimmying", "wheel wobble", "tramping", et cetera. However, with a construction such as above described, when the brakes are suddenly and violently applied, the frame member 10 will tend to move forwardly with respect to the spring 26 and with respect to the left end of the axle by reason of the fact that the shimmy absorbing shackle 33 will tilt rearwardly. With the spring 26 and the left end of the axle in a position further to the rear of the frame than the right side of the axle, the front wheels will tend to turn so that the vehicle may veer or dive to the left.

To prevent the axle and spring from moving rearwardly of the frame, a novel stop mechanism is provided which may be adjusted to either limit the tilting movement of the shimmy absorbing shackle or to lock it in a fixed or rigid position when the brakes are applied.

In Figs. 2 and 3, an embodiment of the invention is shown in connection with a hydraulically actuated brake system and which is adapted to be operated by the fluid in such system.

It will be seen that the device comprises a flanged cylinder 42 mounted on the outside of the bracket 31 and which is secured thereto and to the frame member by any suitable means, such as rivets 43. It will be noted that the cylinder is positioned on the frame above and in alignment with the center of the pivotally mounted shimmy shackle. A reciprocable piston 40 is mounted within the cylinder 42 and is provided with an extended portion which converges into a wedge shaped tongue 44 thus forming a releasable stop or locking member adapted to engage a corresponding wedge shaped recess 45 formed in the extended face 35 of the movable shackle member. The piston 40 is provided with suitable means for returning it in the cylinder and as shown comprises a suitable spring 46 encircling the tongue or wedge portion 44 and which is interposed between the top face of the extended portion 35 and the body of the piston 40, the purpose thereof being to yieldingly maintain the wedge member 44 out of engagement with the recess 45 in the shackle member. A branch conduit 47 leads from the fluid conduit 23 to the interior of the cylinder 42 so that some of the fluid in the brake conduit system will be forced into the cylinder.

From the above description it will appear that when the brake pedal 16 is depressed, the lower arm 22 thereof will move the piston 21 in the master cylinder 20 to compress the liquid therein and in the conduits 23, 24 and 47. As the liquid is compressed, the brakes will be applied in the usual manner and the piston 40 will be forced downwardly in the cylinder 42 against the action of the spring 46 so that the tongue or wedge member 44 will tightly engage the walls of the recess 45 in the movable shackle member with a wedging action, to rigidly lock the shackle against any tilting movement. It will be seen from the above that by this structure, the spring assembly 26 and the axle will be held rigidly against any relative movement with respect to the frame when the brakes are applied. As soon as the brake pedal is released, the piston 21 is retracted in the master cylinder thereby relieving the fluid pressure from the top face of the piston 40 so that the spring 46 is free to return the piston in the cylinder, thus withdrawing the tongue 44 from the recess 45 and allowing the shackle member to function normally.

It may be here pointed out that the return spring 46 for the piston may be of such tension as to allow the wedge member 44 to only partially enter the recess 45 in the shackle member, so that instead of positively locking the shackle member against movement, a limited pivotal movement thereof will be permitted. It will also be understood that other suitable return means may be provided for the piston such as a linkage connected to the brake actuating mechanism whereby the piston will be returned in the cylinder concomitantly upon release of the brakes.

In Fig. 4 the invention is shown as applied to a vehicle having mechanical brake actuating mechanism. A brake pull rod or cable 48 extends from the brake pedal along the frame member 10 to the brake mechanism. A cylinder 49, open at both ends, is secured to the frame member, and carries a releasable tongue or wedge member as in the embodiment shown in Figs. 1 and 2. A bell crank lever 50 is suitably secured to the brake pull rod or cable 48 as at 51 and is pivoted as at 52 to the frame member. The lower arm 53 of the bell crank lever rests on the top face of the piston 54 which in this instance extends above the top of the cylinder 49. The remaining construction of this embodiment is similar to the hydraulic structure above described. It will be seen that when the brake cable 48 is pulled to the right, as it would be upon application of the brakes, the bell crank lever will force the piston 54 downwardly against the action of the spring, thus wedging the tongue within the recess in the shackle member. When the brakes are released, the piston will be raised upwardly in the cylinder by reason of the spring, thus withdrawing the tongue from the shackle.

It will be apparent from the foregoing that simple and efficient means have been provided for either rigidly locking or merely limiting the movement of the movable shimmy shackle of a spring suspension system under certain operating conditions of the vehicle. By the construction and arrangement of parts shown and described, the vehicle will be prevented from veering or diving to one side of the road upon application of the brakes, thus eliminating a tendency which has heretofore been prevalent in constructions of this character.

Although only two specific embodiments of the invention have been shown and described, the principles involved are susceptible of numerous other applications which will readily occur to persons skilled in the art. The invention, therefore, is to be limited only as indicated by the scope of the appended claims.

Having thus described the invention, what is claimed and desired to be secured by Letters Patent is:

1. In a motor vehicle having a chassis frame, a spring supporting the frame, and hydraulically operated brake actuated mechanism, said mechanism including a master fluid cylinder, fluid conduits leading from the cylinder to the brake mechanism, and means operated by the brake pedal for forcing the fluid from the master cylinder through the conduits; a movable shackle member supporting one end of the spring and pivoted thereto and to the frame, said shackle member having a recess in a face thereof, an auxiliary cylinder mounted on the frame member above the shackle, an auxiliary conduit connecting one of the brake fluid conduits with the auxiliary cylinder, a piston reciprocable in the auxiliary cylinder having a tongue thereon adapted to engage the recess in the shackle member, said piston being adapted to be forced downwardly by the fluid pressure in said auxiliary cylinder when force is applied to the brake pedal so that the tongue engages the shackle member to maintain said member rigidly fixed, and means for returning the piston in the auxiliary cylinder when the fluid pressure is released therefrom.

2. In a vehicle body suspension system, the combination of a vehicle spring, a frame member, a member pivoted to the spring and to the frame member for movement in opposite directions, resilient means associated with the movable member and the frame to provide limited pivotal movement of the movable member relative to the frame, and stop means engageable with the movable member to prevent pivotal movement thereof in either of said directions under certain operating conditions of the vehicle.

3. In a suspension system for a vehicle frame, a pair of leaf springs supporting the frame, one of said springs being fixed at one end against longitudinal movement relative to the frame and the other of said springs being mounted for restricted longitudinal movement relative to the frame, and movable means for locking one end of the movable spring member against forward and rearward longitudinal movement relative to the frame.

4. In a motor vehicle, the combination of brake actuating means, a pivotally mounted spring shackle movable in opposite directions, and locking means engageable with the shackle to lock the shackle against movement in either of said directions, said means being operatively positioned by the brake actuating means.

5. In a motor vehicle, a spring supported member, a spring connected at one end to said member for movement normally longitudinally of the vehicle and means for holding the spring end from movement forwardly or rearwardly with relation to said member.

6. In a motor vehicle, a spring supported member, a spring connected at one end to said member for movement normally longitudinally of the vehicle, a brake mechanism and means for holding the spring end from movement forwardly or rearwardly with relation to said member when the brake is applied.

7. In a motor vehicle, a spring supported member, a spring connected at one end to said member for movement normally longitudinally of the spring in opposite directions and means for holding said spring end from movement longitudinally in either of said directions.

8. In a motor vehicle, a frame, a spring, a movably mounted shackle for connecting one end of the spring with the frame constructed to permit normally longitudinal movement of the latter end of the spring with relation to the frame in opposite directions and means for holding the shackle and thereby the connected spring end from movement in either of said directions.

9. In a motor vehicle, a frame, a spring, a movably mounted shackle for connecting one end of the spring with the frame constructed to permit normally longitudinal movement of the latter end of the spring with relation to the frame and means for holding the latter end of the spring against longitudinal movement forwardly or rearwardly with relation to the frame.

10. In a vehicle body suspension system having longitudinally extending leaf springs and a chassis frame, the combination of a cylinder fixed to the frame, a piston reciprocable in the cylinder, means for reciprocating said piston, a spring shackle pivoted to the frame beneath the cylinder and having a recess into which said piston can be engaged or withdrawn and coiled springs between the cylinder and the shackle, said piston preventing any pivotal movement of said shackle relative to said frame when engaged in said recess.

11. In a motor vehicle having a chassis frame, a spring supporting the frame and brake actuating mechanism, said mechanism including brake cables leading to the brakes and operable by the brake pedal; a movable shackle member supporting one end of the spring and pivoted thereto and to the frame, said shackle member having a recess therein, a cylinder mounted on the frame, a piston reciprocable in the cylinder having a tongue thereon adapted to engage the recess in the shackle member to hold the shackle from movement, a bell crank lever connected to and actuated by one of the brake cables, said bell crank lever being adapted to move the piston when the brakes are applied so that the tongue engages the shackle to prevent movement thereof, and means for returning the piston in the cylinder to disengage the tongue when the brakes are released.

12. In a vehicle body suspension system having longitudinally extending leaf springs and a chassis frame, the combination of a cylinder fixed to the frame, a piston reciprocable in the cylinder, hydraulic and spring means for reciprocating said piston, a spring shackle pivoted to the frame beneath the cylinder and having a recess into which said piston can be engaged or withdrawn and coiled springs between the cylinder and the shackle, said piston preventing any pivotal movement of said shackle relative to said frame when engaged in said recess.

13. In a vehicle body suspension system having longitudinally extending leaf springs and a chassis frame, the combination of a cylinder fixed to the frame, a piston reciprocable in the cylinder, manual means for controlling the reciprocation of said piston, a spring shackle pivoted to the frame beneath the cylinder and having a recess into which said piston can be engaged or withdrawn and coiled springs between the cylinder and the shackle, said piston preventing any pivotal movement of said shackle relative to said frame when engaged in said recess.

CLYDE R. PATON.